United States Patent

Nagasawa

(10) Patent No.: US 10,696,246 B2
(45) Date of Patent: Jun. 30, 2020

(54) CORRUGATED TUBE HOLDER AND WIRE HARNESS

(71) Applicant: YAZAKI CORPORATION, Tokyo (JP)

(72) Inventor: Masanori Nagasawa, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/600,420

(22) Filed: Oct. 11, 2019

(65) Prior Publication Data

US 2020/0156568 A1 May 21, 2020

(30) Foreign Application Priority Data

Nov. 15, 2018 (JP) .................................. 2018-214896

(51) Int. Cl.
*B60R 16/02* (2006.01)
*H02G 3/06* (2006.01)
*H01B 7/00* (2006.01)
*H02G 3/04* (2006.01)

(52) U.S. Cl.
CPC ....... *B60R 16/0215* (2013.01); *H01B 7/0045* (2013.01); *H02G 3/0691* (2013.01); *H02G 3/0468* (2013.01)

(58) Field of Classification Search
CPC ...... H02G 3/0691; H02G 3/32; H02G 15/085; H02G 3/0468; B60R 16/0215; H01B 7/0045; H01R 9/0524; F16L 3/1091; Y10S 285/903

See application file for complete search history.

(56) References Cited

U.S. PATENT DOCUMENTS

| | | | | |
|---|---|---|---|---|
| 4,564,163 A * | 1/1986 | Barnett | ..................... | F16L 3/12 24/16 PB |
| 4,904,000 A * | 2/1990 | Matsui | ................ | H02G 3/0691 285/305 |
| 5,908,327 A * | 6/1999 | Tsuji | .................... | H01R 13/506 439/470 |
| 6,568,967 B2 * | 5/2003 | Inaba | ................... | H01R 13/501 439/701 |
| 2009/0050350 A1 * | 2/2009 | Katsumata | ........... | H02G 3/0691 174/135 |
| 2010/0148015 A1 * | 6/2010 | Matsuno | ............... | F16L 3/1075 248/65 |

(Continued)

FOREIGN PATENT DOCUMENTS

JP    2013-254580 A    12/2013

*Primary Examiner* — Steven T Sawyer
(74) *Attorney, Agent, or Firm* — Kenealy Vaidya LLP

(57) ABSTRACT

A corrugated tube holder configured to retain a corrugated tube having a perfect circular shape in a cross section orthogonal to an axial direction of the corrugated tube, the corrugated tube having recessed portions extending around an outer peripheral surface of the corrugated tube, the corrugated tube holder including a first protruding portion configured to be in an annular shape to engage with one of the recessed portions to retain the corrugated tube, the first protruding portion having an imperfect circular shape in a cross section orthogonal to the axial direction when the first protruding portion is engaged with the one of the recessed portions to retain the corrugated tube.

13 Claims, 6 Drawing Sheets

(56) References Cited

U.S. PATENT DOCUMENTS

| | | | |
|---|---|---|---|
| 2010/0164226 A1* | 7/2010 | Serizawa | F16L 3/1091 |
| | | | 285/149.1 |
| 2014/0151514 A1* | 6/2014 | Asai | B60R 16/0215 |
| | | | 248/74.1 |
| 2017/0179697 A1* | 6/2017 | Terashima | H02G 3/0462 |

* cited by examiner

US 10,696,246 B2

CORRUGATED TUBE HOLDER AND WIRE HARNESS

CROSS-REFERENCE TO RELATED APPLICATION

The present application claims priority to Japanese Patent Application No. 2018-214896 filed on Nov. 15, 2018, the entire content of which is incorporated herein by reference.

TECHNICAL FIELD

The present invention relates to a corrugated tube holder and a wire harness.

BACKGROUND

A related art holder (also called a "cover") has, in general, protruding portions (ribs) provided on an inner wall surface of the holder. To hold a corrugated tube so as not to be detached from the holder, the protruding portions are engaged with recessed portions on an outer peripheral surface of the corrugated tube.

In a case where an external three is applied to the corrugated tube, for example, the corrugated tube may be deformed so as to be reduced in diameter, then the corrugated tube may be detached from the holder.

In order to prevent the detachment of the corrugated tube, for example, the related art holder has pins projecting from the inner wall surface of the holder toward the corrugated tube, and the pins are inserted into engagement holes provided in the corrugated tube. A displacement of the corrugated tube is prevented by the pins and as a result, the corrugated tube is prevented from being detached even in a case where the corrugated tube is reduced in diameter (see, e.g., JP2013-254580A).

When actually attaching the corrugated tube to the related art holder, it is necessary to align the columnar protrusion of the holder and the engagement hole of the corrugated tube. Such alignment may complicate assembling of the corrugated tube and the holder, which may cause a reduction in work efficiency of the assembling. In addition, in areas other than the pins, the protruding portions provided so as to surround the corrugated tube in a circumferential direction are inserted in the recessed portions on the outer peripheral surface of the corrugated tube while being pressed. Such pressing of the protruding portions requires a corresponding force, which may also cause a reduction in work efficiency of the assembling.

SUMMARY

Illustrative aspects of the present invention provide a wire harness and a corrugated tube holder that can improve work efficiency of assembling of a corrugated tube and a holder.

According to an illustrative aspect of the invention, a corrugated tube holder configured to retain a corrugated tube having a perfect circular shape in a cross section orthogonal to an axial direction of the corrugated tube, the corrugated tube having recessed portions extending around an outer peripheral surface of the corrugated tube. The corrugated tube holder includes a first protruding portion configured to be in an annular shape to engage with one of the recessed portions to retain the corrugated tube, the first protruding portion having an imperfect circular shape in a cross section orthogonal to the axial direction when the first protruding portion is engaged with the one of the recessed portions to retain the corrugated tube.

Other aspects and advantages of the invention will be apparent from the following description, the drawings and the claims.

DESCRIPTION OF EMBODIMENTS

Figure 1:
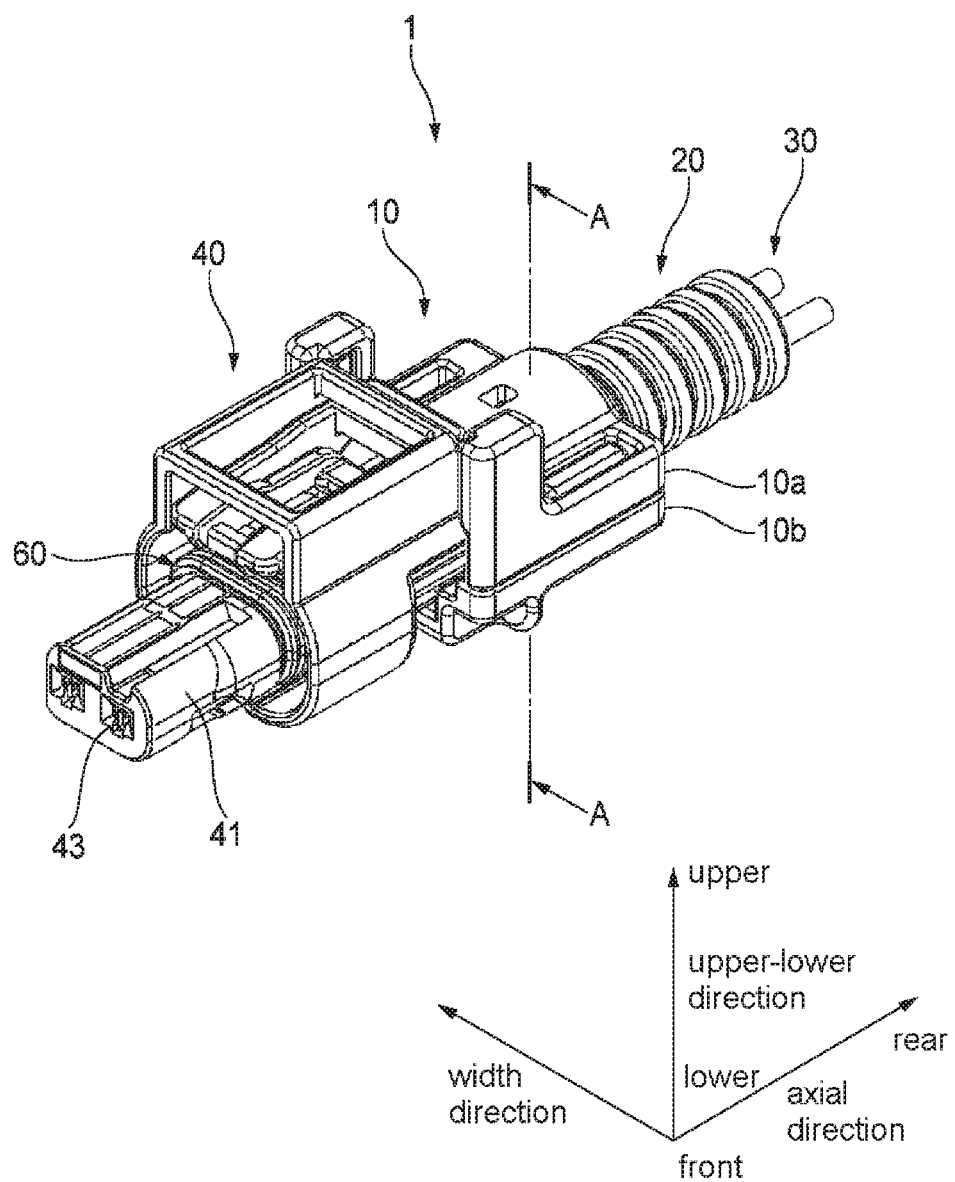
FIG. 1 is a perspective view of a connector including a cover according to an embodiment of the present invention.

Hereinafter, a connector 1 including a cover 10 (an example of a corrugated tube holder) according to an embodiment of the present invention will be described with reference to the drawings. For the purpose of convenience, an "axial direction", a "width direction", an "upper-lower direction", as well as "upper", "lower", "front" and "rear" directions are defined as shown in FIG. 1. The "axial direction", the "width direction", and the "upper-lower direction" are orthogonal to one another. The axial direction is the same with an inserting direction of a terminal 31 (shown in FIG. 2) to a terminal accommodating chamber of a housing 40, and a fitting direction of the connector 1 and a mating connector (not shown). A front side (left lower side in FIG. 1) in the fitting direction in which the connector 1 is fitted to the mating connector is a front side, and a back side (right upper side in FIG. 1) in the fitting direction, which is opposite to the front side, is a rear side.

Figure 2:
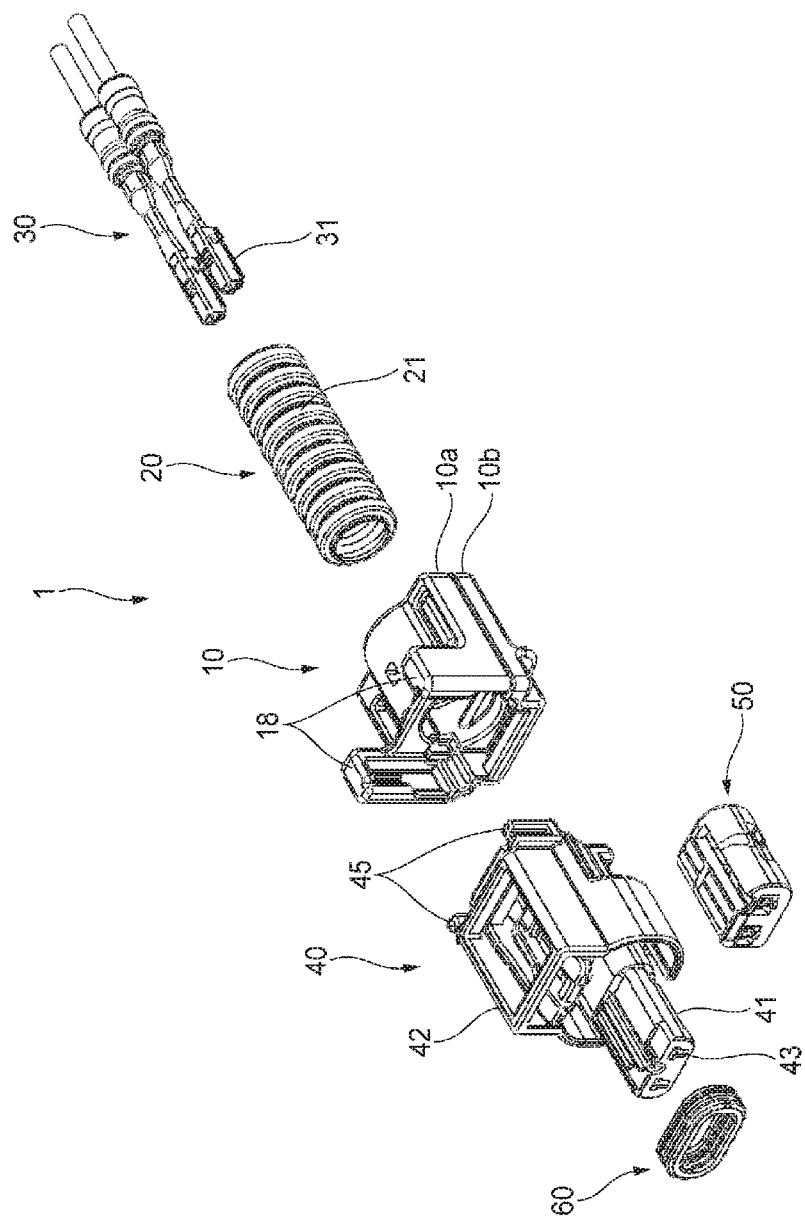
FIG. 2 is an exploded perspective view of the connector shown in FIG. 1.

As shown in FIGS. 1 and 2, the connector 1 includes the cover 10, a corrugated tube 20, an electric wire 30, the housing 40, a retainer 50, and a gasket 60.

The cover 10 is configured to hold a front end portion of the corrugated tube 20 through which the electric wire 30 is inserted. Such a cover is sometimes called a protector. As shown in FIGS. 1 and 2, in the illustrated example, the cover 10 for holding the front end portion of the corrugated tube 20 through which the electric wire 30 is inserted is attached to the housing 40 of the connector 1.

The corrugated tube 20 is an exterior member for protecting the electric wire 30 inserted therethrough. As shown in FIGS. 1 and 2, the corrugated tube 20 is a flexible resin cylindrical member provided with one slit (not shown) extending in the axial direction over the entire axial length. The corrugated tube 20 has a perfect circular shape in a cross section orthogonal to the axial direction. As shown in FIGS. 1, 2, 4 and 5, on the outer peripheral surface of the corrugated tube 20, a plurality of annular recessed portions 21 recessed radially inward are provided so as to be aligned at predetermined intervals (pitches) along the axial direction. Annular protruding portions projecting radially outward, each of the annular protruding portions is formed between recessed portions 21 adjacent in the axial direction.

As shown in FIGS. 1 and 2, the electric wire 30 is configured as a bundle of a plurality of (two) electric wires in this example. The electric wire 30 may be formed of only one electric wire. A metal terminal (female terminal in this example) 31 is provided at a front end portion of the electric wire 30. The terminal 31 is to be inserted into a terminal accommodating chamber (to be described later) of the housing 40. The cover 10, the corrugated tube 20, and the electric wire 30 constitute the "wire harness" of the present invention.

Figure 3:
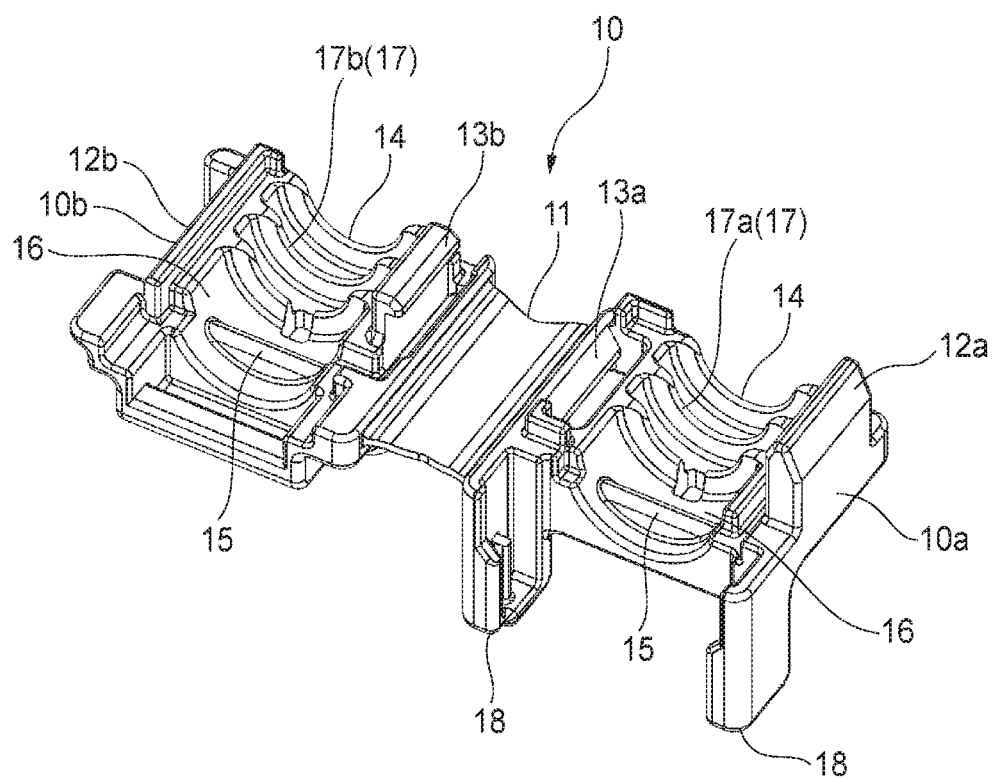
FIG. 3 is a perspective view showing an open state of the cover shown in FIG. 2.

Hereinafter, a configuration of the cover 10 will be described first. As shown in FIGS. 1 to 3, the resin cover 10 includes an upper cover 10a of an upper portion of the cover 10 and a lower cover 10b of a lower portion of the cover 10. The upper cover 10a and the lower cover 10b are connected to each other via a hinge portion 11 so as to be rotatable relative to each other via the hinge portion 11. The cover 10 is brought into an open state (shown in FIG. 3) by opening the upper cover 10a and the lower cover 10b, and is brought into a closed state by closing the upper cover 10a and the lower cover 10b (shown in FIG. 2).

Figure 4:
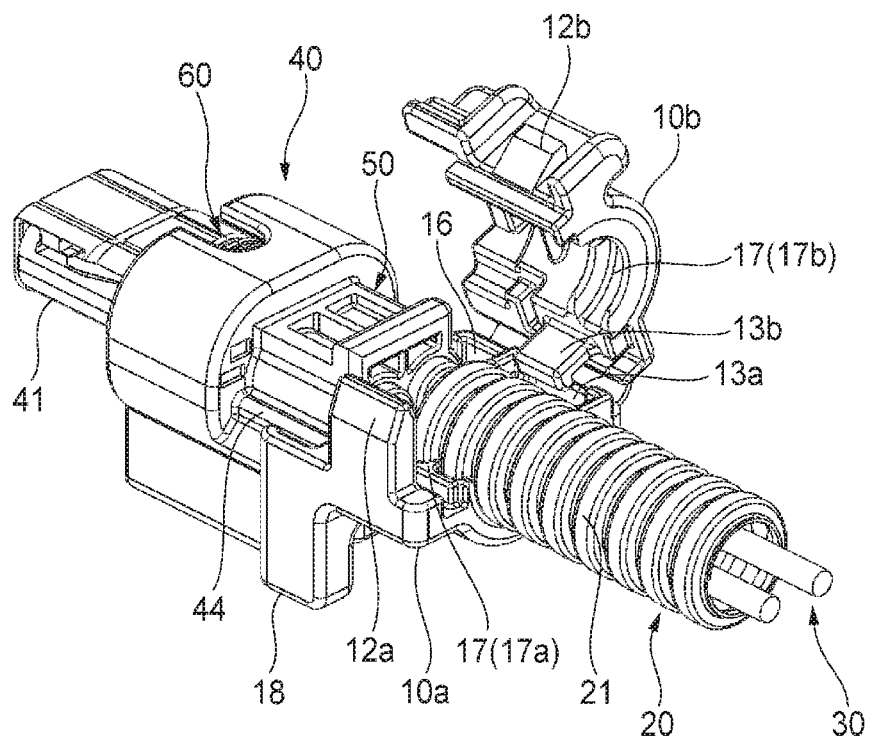
FIG. 4 is a perspective view illustrating how the cover is attached to a housing in a process of assembling the connector shown in FIG. 1.
Figure 6A:
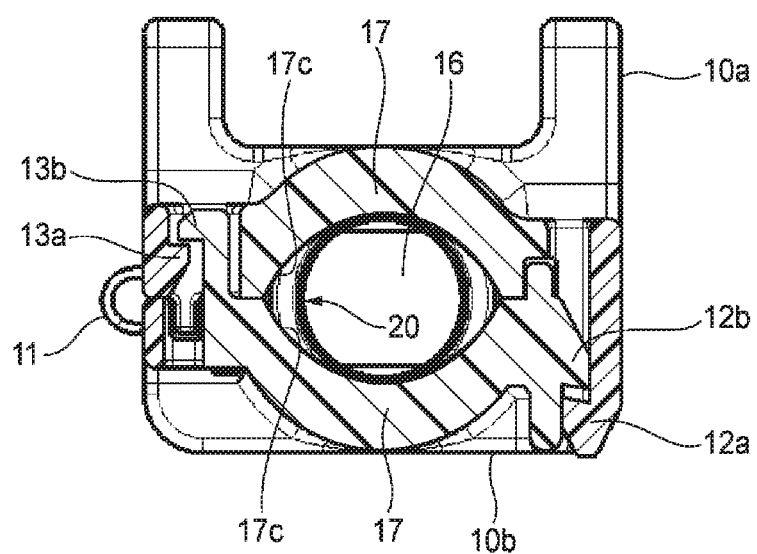
FIG. 6A is a cross-sectional view taken along a line B-B in FIG. 5.

As shown in FIGS. 3, 4 and 6A, locking portions 12a, 13a are provided on both sides in a width direction of the upper cover 10a, and locking portions 12b, 13b are provided on both sides in a width direction of the lower cover 10b. In the closed state of the cover 10, the locking portions 12a, 13a are engaged with the locking portions 12b, 13b respectively to maintain the closed state of the cover 10.

In the closed state of the cover 10, a cylindrical electric wire insertion hole penetrating in the axial direction is formed in the cover 10. As shown in FIG. 3, a rib 15 is provided on an inner wall surface of the electric wire insertion hole at a position being distant by a predetermined distance from a rear opening end surface 14, the rib 15 protruding radially inward from both an upper cover 10a and a lower cover 10b.

In the closed state of the cover 10, a portion between the rib 15 and the opening end surface 14 in the electric wire insertion hole functions as an accommodating space 16 (shown in FIGS. 3 to 6B for holding the front end portion of the corrugated tube 20. That is, the accommodating space 16 is defined by placing the upper cover 10a on the lower cover 10b in a predetermined sandwiching direction (in this example, the upper-lower direction) intersecting the axial direction. On the inner wall surface of the accommodating space 16, a plurality of (three in this example) protruding ribs 17a projecting radially inward and extending in a circumferential direction of the corrugated tube 20 are provided on the upper cover 10a side so as to be aligned at predetermined intervals (pitches) along the axial direction, and a plurality of (three in this example) protruding ribs 17b projecting radially inward and extending in the circumferential direction are provided on the lower cover 10b side so as to be aligned at predetermined intervals (pitches) along the axial direction. In the closed state of the cover 10 (that is, in a state where the accommodating space 16 is defined), the plurality of protruding ribs 17a and the plurality of protruding ribs 17b form a plurality of (three in this example) annular protruding portions 17. A detailed configuration of the protruding portion 17 will be described below.

The interval (pitch) between the annular protruding portions 17 adjacent to each other in the axial direction matches the interval (pitch) of the annular recessed portions 21 of the corrugated tube 20 adjacent to each other in the axial direction. Therefore, the front end portion of the corrugated tube 20 can be held in the accommodating space 16 in the closed state of the cover 10, in a state where the protruding portions 17 and the recessed portions 21 are engaged with each other (shown in FIG. 5), such that the corrugated tube 20 would not detached from the cover 10.

As shown in FIG. 3, a pair of locking portions 18 for assembling the cover 10 to the housing 40 is provided at a front end portion of the upper cover 10a. The configuration of the cover 10 has been described above.

Next, a configuration of the housing 40 will be described. As shown in FIG. 2, the resin housing 40 includes a terminal accommodating portion 41 extending in the axial direction and a lock portion 42 provided on an upper portion of the terminal accommodating portion 41.

A terminal accommodating chamber (not shown) running through in the axial direction inside the terminal accommodating portion 41, the terminal accommodating chamber configured to accommodate the terminal 31, is formed. Front end opening 43 of the terminal accommodating chamber functions as insertion opening into which a male terminal (not shown) provided on the mating connector is to be inserted. In a state where the connector is fitted with the mating connector, the terminal 31 accommodated in the terminal accommodating chamber and the male terminal of the mating connector inserted through the front end openings 43 are to be connected to each other, and thus the terminal 31 and the male terminal are electrically connected.

A retainer accommodating portion 44 (also shown in FIG. 4) for assembling the retainer 50 to the housing is formed on a lower portion of the terminal accommodating portion 41, and the retainer 50 is to be attached to the retainer accommodating portion 44 from below. The resin retainer 50 is a member that has a so-called double locking functions, one is for detecting half-insertion of the terminal 31 in the terminal accommodating chamber and the other is for preventing detachment of the terminal 31 from a normal insertion position in the terminal accommodating chamber. Since the retainer 50 has a known configuration, a detailed description thereof will be omitted.

A rubber gasket 60 is provided at a predetermined position on an outer periphery of the terminal accommodating portion 41 (shown in FIGS. 1 and 4). The gasket 60 has a waterproof function that prevents, when provided at the predetermined position, water from entering the connector from an outside in a state where the connector is fitted with the mating connector.

A pair of locking portions 45 for assembling the upper cover 10a (in other words, the cover 10) to the hounding 40 is provided at a rear end portion of the housing 40. The configuration of the housing 40 has been described above.

Next, a procedure of assembling the connector 1 will be described with reference to FIG. 4. First, the terminal 31 of the electric wire 30 which is inserted through the corrugated tube 20 is to be accommodated at a normal insertion position of the terminal accommodating chamber of the housing 40, the retainer 50 is to be attached to the retainer accommodating portion 44 of the housing 40, and the gasket 60 is to be provided at the predetermined position on the outer periphery of the terminal accommodating portion 41 of the housing 40. The order of assembling the respective components is optional.

Next, the pair of locking portions 18 of the upper cover 10a is to be engaged with the pair of locking portions 45 of the housing 40. In this way the cover 10 in the open state is attached to a rear side of the housing 40. Next, the corrugated tube 20 is to be placed in the accommodating space 16 of the upper cover 10a in such a way that the front end portion of the corrugated tube 20 through which the electric wire 30 is inserted is disposed above the accommodating space 16 of the upper cover 10a and the plurality of recessed portions 21 of the corrugated tube 20 are engaged with the plurality of protruding ribs 17a of the upper cover 10a.

Next, in order to bring the cover 10 into the closed state, the lower cover 10b is to be rotated toward the upper cover 10a via the hinge portion 11. When the rotation proceeds until the cover 10 is brought into a state immediately before the closed state, the protruding portions 17 of the cover 10 contact bottom surfaces of the recessed portions 21 of the corrugated tube 20. By rotating the lower cover 10b further after the stage where the protruding portions 17 contact the bottom surfaces of the recessed portions 21, the protruding portions 17 start pressing the bottom surfaces of the recessed portions 21 to elastically deform the recessed portions 21. That is, after this stage, in order to allow the rotation to proceed, a force to make the protruding portions 17 to press the recessed portions 21 is required.

When the rotation further proceeds and the cover 10 is brought into the closed state, the locking portions 12a, 13a on the upper cover 10a side and the locking portion 12b, 13b on the lower cover 10b side are engaged with each other respectively to maintain the closed state of the cover 10. Assembling of the connector 1 shown in FIG. 1 is completed in this way. In the connector 1 for which the assembling is completed (that is, the closed state of the cover 10), the protruding portions 17 are kept in a state of being pressed against the bottom surfaces of the recessed portions 21, and the front end portion of the corrugated tube 20 is held such that the corrugated tube 20 would not to be detached from the accommodating space 16 of the cover 10 by virtue of the engagement of the protruding portions 17 and the recessed portions 21.

Next, a configuration of the annular protruding portion 17 of the cover 10 according to the embodiment of the present invention will be described in detail shown in FIGS. 5, 6A and 6B. As shown in FIGS. 6A and 6B, in a cross section of the cover 10 in the closed state taken along a direction orthogonal to the axial direction, a contour shape of a front end surface 17c of each protruding portion 17 has an imperfect circular shape (a circular shape but not a perfect circular shape).

Figure 5:
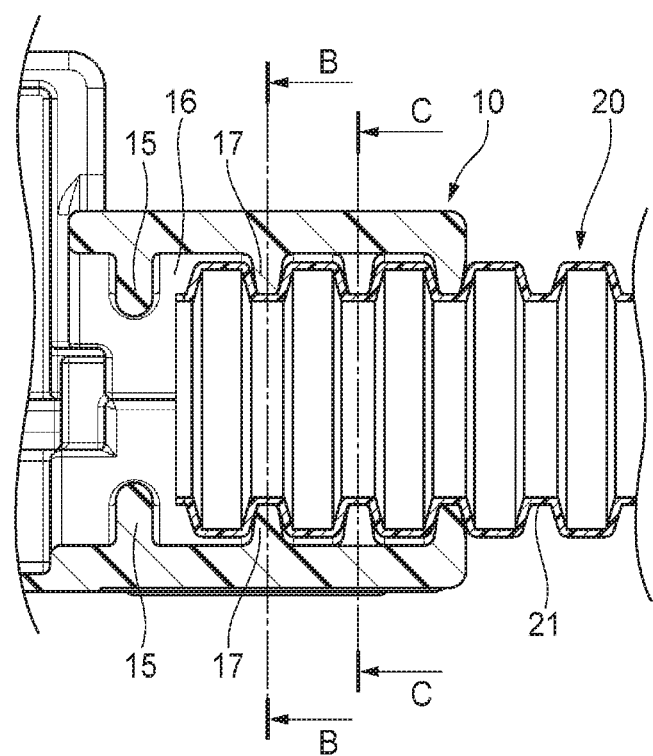
FIG. 5 is a cross-sectional view, taken along a line A-A in FIG. 1, in which a periphery of the cover shown in FIG. 1 is enlarged.
Figure 6B:
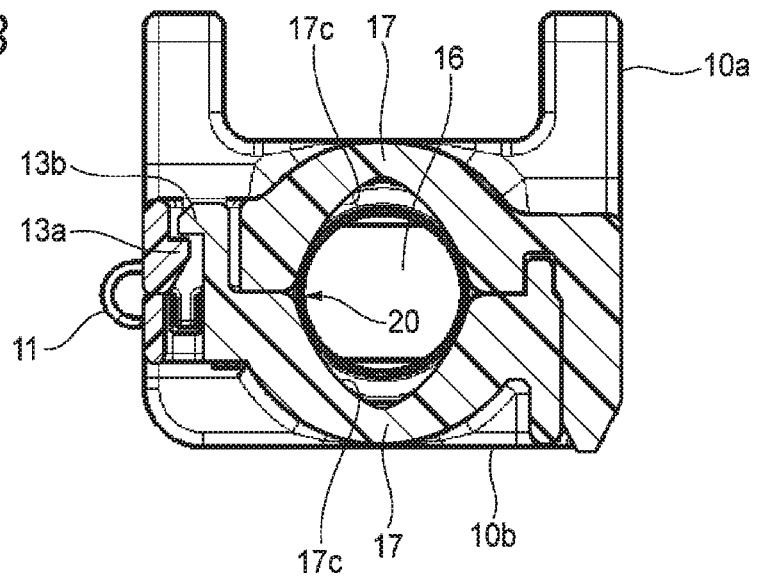
FIG. 6B is a cross-sectional view taken along a line C-C in FIG. 5.

Specifically, in the example shown in FIGS. 5, 6A and 6B, among the three protruding portions 17 aligned in the axial direction and accommodated in the cover 10, two protruding portions 17 located on both end sides in the axial direction, each of the two protruding portions 17 has an imperfect circular shape whose inner diameter in a width direction is larger than an inner diameter in the upper-lower direction (shown in FIG. 6A), and one protruding portion 17 located at a center in the axial direction between the two protruding portions 17 has a different imperfect circular shape whose inner diameter in the width direction is smaller than an inner diameter in the upper-lower direction (shown in FIG. 6B).

As a result, each of the two protruding portions 17 located on both end sides in the axial direction contacts the bottom surface of the recessed portion 21 at an upper portion including an upper end and at a lower portion including a lower end in the circumferential direction, and is separated from the bottom surface of the recessed portion 21 at other portions in the circumferential direction. The one protruding portion 17 located at the center in the axial direction contacts the bottom surface of the recessed portion 21 at both width-direction end portions including both width-direction ends in the circumferential direction, and is separated from the bottom surface of the recessed portion 21 at other portions in the circumferential direction.

As described above, each protruding portion 17 presses the bottom surface of the recessed portion 21 at a first part of the corrugated tube 20, and is separated from the bottom surface of the recessed portion 21 at a second part of the corrugated tube 20, the first part and the second part not overlapping each other in the circumferential direction. Therefore, when the corrugated tube 20 is deformed at a position where the protruding portion 17 presses the bottom surface of the recessed portion 21, a deformation amount can be released to a place where the protruding portion 17 do not contact the bottom surface of the recessed portion 21. Therefore, a force to make the protruding portion 17 to press the recessed portion 21 (that is, a force required for assembling the corrugated tube 20 and the cover 10) is reduced as compared with a case where the annular protruding portion is pressed against the recessed portion over the entire circumference of the corrugated tube. Therefore, the cover 10 according to the embodiment of the present invention can improve the work efficiency in assembling of the corrugated tube 20 and the cover 10 as compared with a holder in the related art.

The inventor found based on experiments and analyses that, by setting a ratio of a length of the first part (a portion where the protruding portion 17 presses the bottom surface of the recessed portion 21) of the corrugated tube to a length of the second part (a portion where the protruding portion 17 do not contact the bottom surface of the recessed portion 21) in the range of 1:1 to 1:2, work efficiency in assembling of the corrugated tube 20 to the cover 10 can be improved and also a sufficient holding force of the corrugated tube 20 by the cover 10 can be maintained.

Further, in the cover 10 according to the embodiment of the present invention, in the circumferential direction, a position where one of the protruding portions 17 adjacent with one each other in the axial direction is engaged with the corresponding recessed portion 21 is different from a position where the other protruding portions 17, being adjacent to the one of the protruding portions 17, are engaged with the recessed portion 21. Accordingly, for example, in a case where the corrugated tube 20 is stretched in a direction (rear side) to which the corrugated tube 20 is pulled to be detached from the cover 10 or the like, even if the corrugated tube 20 is displaced (reduced) in a radial direction and if one of the recessed portion 21 is detached from one of the protruding portions 17, the other recessed portions 21 are unlikely to be detached from the other protruding portions 17. Therefore, the corrugated tube 20 can be held more firmly.

While the present invention has been described with reference to certain exemplary embodiments thereof, the scope of the present invention is not limited to the exemplary embodiments described above, and it will be understood by those skilled in the art that various changes and modifications may be made therein without departing from the scope of the present invention as defined by the appended claims.

According to the above embodiment, among the three protruding portions 17 aligned adjacent to each other in the axial direction, circumferential positions of "a part" (the portion where the protruding portion 17 presses the bottom surface of the recessed portion 21) of the two protruding portions 17 located on both sides in the axial direction coincide with each other. Meanwhile, all of the circumferential positions of "a part" (the portion where the protruding portion 17 presses the bottom surface of the recessed portion 21) of the three protruding portions 17 aligned adjacent to each other in the axial direction may be different from one another. Further, all of the circumferential positions of "a part" (the portion where the protruding portion 17 presses the bottom surface of the recessed portion 21) of the three protruding portions 17 aligned adjacent to each other in the axial direction may coincide with one another.

According to one or more of the exemplary embodiments described above, a corrugated tube holder (10) configured to retain a corrugated tube (20) having a perfect circular shape (designed to have a shape of a perfect circle, i.e., a true circle) in a cross section orthogonal to an axial direction of the corrugated tube (20), the corrugated tube (20) having recessed portions (21) extending around an outer peripheral surface of the corrugated tube (20), the corrugated tube holder (10) including: a first protruding portion (17) configured to be in an annular shape to engage with one of the recessed portions (21) to retain the corrugated tube (20), wherein the first protruding portion (17) has an imperfect circular shape (designed to have a shape of an imperfect circle, i.e., not a perfect circle) in a cross section orthogonal to the axial direction when the first protruding portion (17) is engaged with the one of the recessed portions (21) to retain the corrugated tube (20).

According to the corrugated tube holder configured as above, the annular protruding portion that is to be engaged with the one of the recessed portions on the outer peripheral surface of the corrugated tube having a perfect circular shape in a cross section orthogonal to the axial direction of the corrugated tube has an imperfect circular shape in the cross section orthogonal to the axial direction. Accordingly, during assembling of the corrugated tube and the corrugated tube holder, a part of the annular protruding portion in the circumferential direction is to be pressed against the recessed portion, and the other part of the annular protruding portion in the circumferential direction do not contact the corrugated tube in a pressed manner (or do not contact the recessed portion). Therefore, even if the corrugated tube is deformed inward in the radial direction due to pressing of a part of the annular protruding portion, the corrugated tube may be deformed outward in the radial direction at a position corresponding to the other part of the annular protruding portion. In other words, the corrugated tube can be released to a position corresponding to the other part of the annular protruding portion when being deformed. Also, unlike the above-described the related art holder, a force required for attaching the corrugated tube holder to the corrugated tube can be reduced. Therefore, the corrugated tube holder with this configuration can improve the work efficiency in assembling of the corrugated tube and the corrugated tube holder as compared with the related art holder.

The first protruding portion (17) may be configured such that, when the protruding portion (17) is engaged with the one of the recessed portions (21) to retain the corrugated tube (20), the first protruding portion (17) contacts the one of the recessed portions (21) at a first part of the corrugated tube (20) but does not contact the one of the recessed portions (21) at a second part of the corrugated tube (20), the first part of the corrugated tube (20) and the second part of the corrugated tube (20) not overlapping each other in a circumferential direction of the corrugated tube (20).

In other words, when the corrugated tube and the corrugated tube holder are assembled, the protruding portion is engaged with the recessed portion at the first part of the corrugated tube, and the protruding portion is separated from the recessed portion at the other part of the corrugated tube not overlapping the first part in the circumferential direction.

With respect to the circumferential direction, a ratio of a length of the first part of the corrugated tube (20) to a length of the second part may be in a range of 1:1 to 1:2.

With this configuration, the inventor found based on experiments and analyses that not only the work efficiency described above can be improved but also a sufficient holding force of the corrugated tube can be maintained.

The corrugated tube holder (10) may further include a second protruding portion (17) configured to be in an annular shape to engage with another one of the recessed portions (21) to retain the corrugated tube (20) such that the first protruding portion (17) and the second protruding portion (17) are arranged side by side in the axial direction, wherein, when the second protruding portion (17) is engaged with the other one of the recessed portions (21) to retain the corrugated tube (20), the second protruding portion (17) has an imperfect circular shape in a cross section orthogonal to the axial direction, and the second protruding portion (17) contacts the other one of the recessed portions (21) at a third part of the corrugated tube (20), the third part of the corrugated tube (20) not overlapping the first part of the corrugated tube (20) in the circumferential direction.

According to the corrugated tube holder configured as above, a plurality of protruding portions are provided to be aligned along the axial direction of the corrugated tube, and the position where one of the protruding portions is to be engaged with the corresponding one of the recessed portions is different from the position where one of the other protruding portions is to be engaged with the other corresponding one of recessed portions in the circumferential direction of the corrugated tube. Accordingly, when the corrugated tube is displaced in the axial direction after the above-described assembling, even if the recessed portion is temporarily detached from the "one of the protruding portions", the recessed portion is less likely to be detached from "the other protruding portions". Therefore, the corrugated tube can be held more firmly.

According to one or more of the exemplary embodiments described above, a wire harness includes: an electric wire (30); a corrugated tube (20) through which the electric wire (30) is inserted; and the corrugated tube holder (10), wherein the first protruding portion (17) of the corrugated tube holder (10) is configured to engage with the recessed portion (21) on the outer peripheral surface of the corrugated tube (20) to restrict a movement of the corrugated tube (20) in the axial direction.

What is claimed is:

1. A corrugated tube holder configured to retain a corrugated tube having a perfect circular shape in a cross section orthogonal to an axial direction of the corrugated tube, the corrugated tube having recessed portions extending around an outer peripheral surface of the corrugated tube, the corrugated tube holder comprising:
   a first protruding portion configured to be in an annular shape to engage with one of the recessed portions to retain the corrugated tube and
   a second protruding portion configured to be in an annular shape to engage with another one of the recessed portions to retain the corrugated tube such that the first protruding portion and the second protruding portion are arranged side by side in the axial direction,
   wherein the first protruding portion has an imperfect circular shape in a cross section orthogonal to the axial direction when the first protruding portion is engaged with the one of the recessed portions to retain the corrugated tube, wherein the second protruding portion has an imperfect circular shape in a cross section orthogonal to the axial direction when the second protruding portion is engaged with the another one of the recessed portions to retain the corrugated tube, and
wherein the imperfect circular shape of the second protruding portion is oriented differently from the imperfect circular shape of the first protruding portion with respect to a circumferential direction of the corrugated tube.

2. The corrugated tube holder according to claim 1,
wherein the first protruding portion is configured such that, when the protruding portion is engaged with the one of the recessed portions to retain the corrugated tube, the first protruding portion contacts the one of the recessed portions at a first part of the corrugated tube but does not contact the one of the recessed portions at a second part of the corrugated tube, the first part of the corrugated tube and the second part of the corrugated tube not overlapping each other in the circumferential direction of the corrugated tube.

3. The corrugated tube holder according to claim 2,
wherein, with respect to the circumferential direction, a ratio of a length of the first part of the corrugated tube to a length of the second part is in a range of 1:1 to 1:2.

4. The corrugated tube holder according to claim 2,
wherein, when the second protruding portion is engaged with the other one of the recessed portions to retain the corrugated tube, the second protruding portion contacts the other one of the recessed portions at a third part of the corrugated tube, the third part of the corrugated tube not overlapping the first part of the corrugated tube in the circumferential direction.

5. A wire harness comprising:
an electric wire;
a corrugated tube through which the electric wire is inserted, the corrugated tube having a perfect circular shape in a cross section orthogonal to an axial direction of the corrugated tube; and
a corrugated tube holder configured to retain the corrugated tube,
wherein the corrugated tube comprises recessed portions extending around an outer peripheral surface of the corrugated tube,
wherein the corrugated tube holder comprises a first protruding portion configured to be in an annular shape to engage with one of the recessed portions to retain the corrugated tube,
wherein the corrugated tube holder comprises a second protruding portion configured to be in an annular shape to engage with another one of the recessed portions to retain the corrugated tube such that the first protruding portion and the second protruding portion are arranged side by side in the axial direction,
wherein the first protruding portion has an imperfect circular shape in a cross section orthogonal to the axial direction when the first protruding portion is engaged with the one of the recessed portions to retain the corrugated tube,
wherein the second protruding portion has an imperfect circular shape in a cross section orthogonal to the axial direction when the second protruding portion is engaged with the another one of the recessed portions to retain the corrugated tube,
wherein the first protruding portion of the corrugated tube holder is configured to engage with one of the recessed portions on the outer peripheral surface of the corrugated tube to restrict a movement of the corrugated tube in the axial direction
wherein the imperfect circular shape of the second protruding portion is oriented differently from the imperfect circular shape of the first protruding portion with respect to a circumferential direction of the corrugated tube.

6. The wire harness according to claim 5,
wherein each of the recessed portions has a lower end portion, an upper end portion, a first width-direction end portion, and a second width-direction end portion arranged in a circumferential direction of the recessed portion, and
wherein the first protruding portion contacts the one of the recessed portions at the upper end portion and the lower end portion of the one of the recessed portions, and the second protruding portion contacts the other one of the recessed portions at the first width-direction end portion and the second width-direction end portion of the other one of the recessed portions.

7. The corrugated tube holder according to claim 1,
wherein the first protruding portion has a first diameter in a width direction and a second diameter in a height direction that is different from the first diameter, the height direction being orthogonal to the width direction,
wherein the second protruding portion has a third diameter in the width direction and a fourth diameter in the height direction that is different from the third diameter, and
wherein the first diameter is larger than the third diameter and the fourth diameter is larger than the second diameter.

8. The corrugated tube holder according to claim 1, further comprising:
a third protruding portion configured to be in an annular shape that has an imperfect circular shape in the cross section orthogonal to the axial direction, the third protruding portion is engaged with a third one of the recessed portions to retain the corrugated tube, and the imperfect circular shape of the third protruding portion is the same as the imperfect circular shape of the first protruding portion, and
wherein the second protruding portion is located between the first protruding portion and the third protruding portion in the axial direction.

9. The corrugated tube holder according to claim 1,
wherein the first protruding portion is configured to elastically deform the one of the recessed portions when the corrugated tube holder retains the corrugated tube.

10. The wire harness according to claim 5,
wherein the first protruding portion elastically deforms the one of the recessed portions.

11. The wire harness according to claim 5, further comprising:
a housing including a terminal accommodating portion and a locking portion,
wherein the electric wire includes a terminal located in the terminal accommodating portion,
wherein the corrugated tube holder includes a locking portion that is connected to the locking portion of the housing.

12. The wire harness according to claim 5,
wherein the first protruding portion has a first diameter in a width direction and a second diameter in a height direction that is different from the first diameter, the height direction being orthogonal to the width direction, wherein the second protruding portion has a third diameter in the width direction and a fourth diameter in the height direction that is different from the third diameter, and wherein the first diameter is larger than the third diameter and the fourth diameter is larger than the second diameter.

13. The wire harness according to claim 6, wherein the corrugated tube holder further comprises a third protruding portion configured to be in an annular shape that has an imperfect circular shape in the cross section orthogonal to the axial direction, the third protruding portion is engaged with a third one of the recessed portions to retain the corrugated tube, and the third protruding portion contacts the corrugated tube at the upper end portion and the lower end portion of the third recessed portion, and wherein the second protruding portion is located between the first protruding portion and the third protruding portion in the axial direction.

\* \* \* \* \*